US012811318B2

(12) United States Patent
Ong

(10) Patent No.: US 12,811,318 B2
(45) Date of Patent: Nov. 24, 2026

(54) SOLDERLESS LED STRIP CONNECTOR

(71) Applicant: AHO Holdings LLC, Zeeland, MI (US)

(72) Inventor: Andrew Ong, Holland, MI (US)

(73) Assignee: AHO Holdings LLC, Zeeland, MI (US)

( * ) Notice: Subject to any disclaimer, the term of this patent is extended or adjusted under 35 U.S.C. 154(b) by 437 days.

(21) Appl. No.: 18/551,484

(22) PCT Filed: Mar. 22, 2022

(86) PCT No.: PCT/US2022/071258
§ 371 (c)(1),
(2) Date: Sep. 20, 2023

(87) PCT Pub. No.: WO2022/204678
PCT Pub. Date: Sep. 29, 2022

(65) Prior Publication Data

US 2024/0178586 A1 May 30, 2024

Related U.S. Application Data

(60) Provisional application No. 63/164,149, filed on Mar. 22, 2021.

(51) Int. Cl.
*H01R 9/24* (2006.01)
*F21S 4/24* (2016.01)
(Continued)

(52) U.S. Cl.
CPC .................. *H01R 9/24* (2013.01); *F21S 4/24* (2016.01); *F21V 23/06* (2013.01); *H01R 4/36* (2013.01); *H01R 9/223* (2013.01); *F21Y 2115/10* (2016.08)

(58) Field of Classification Search
CPC .. H01R 4/36; H01R 9/223; H01R 9/24; F21S 4/24; F21V 23/06; F21Y 2115/10
See application file for complete search history.

(56) References Cited

U.S. PATENT DOCUMENTS

| | | | | |
|---|---|---|---|---|
| 5,013,265 | A * | 5/1991 | Buchter | H01R 25/162 439/744 |
| 8,789,988 | B2 * | 7/2014 | Goldwater | B29C 45/14655 362/217.01 |

(Continued)

FOREIGN PATENT DOCUMENTS

| | | | | | |
|---|---|---|---|---|---|
| GB | 2582046 | A * | 9/2020 | F21V 23/06 |
| WO | WO-2015157898 | A1 * | 10/2015 | F21V 23/00 |

OTHER PUBLICATIONS

International Search Report for PCT/US2022/071258 mailed on Jul. 20, 2022; 2 pp.

(Continued)

*Primary Examiner* — Abdullah A Riyami
*Assistant Examiner* — Thang H Nguyen
(74) *Attorney, Agent, or Firm* — Bodman PLC

(57) ABSTRACT

A connector assembly includes an insulating body having a top surface and opposing first and second side surfaces. First and second light-strip-receiving slots extend respectively through the first and second side surfaces and receive ends of first and second light strips having electrical contacts. Conductive bars are disposed within the insulating body between the top surface and the light-strip-receiving slots and are separated from the light-strip-receiving slots by the insulating body. First and second sets of screws are disposed within the insulating body. Each screw includes a proximal end, an intermediate section threadably engaged at a conductive bar, and a distal end in the first or second light-strip-receiving slot. The distal ends contact the electrical contacts of the light strips. The first set of screws electrically connect (Continued)

to the second set of screws via the conductive bars, forming electrical connections between the first and second light strips.

20 Claims, 7 Drawing Sheets

(51) Int. Cl.

| | |
|---|---|
| ***F21V 23/06*** | (2006.01) |
| ***H01R 4/36*** | (2006.01) |
| ***H01R 9/22*** | (2006.01) |
| *F21Y 115/10* | (2016.01) |

(56) References Cited

U.S. PATENT DOCUMENTS

| | | | | |
|---|---|---|---|---|
| 10,458,638 | B1 * | 10/2019 | Tirosh | F21V 21/005 |
| 10,591,114 | B1 * | 3/2020 | Lassen | F21V 15/013 |
| 10,826,202 | B1 * | 11/2020 | Lowe | H01R 35/04 |
| 2010/0142204 | A1 * | 6/2010 | Bishop | F21K 9/27 362/249.02 |

OTHER PUBLICATIONS

6 Pin LED Connector 12mm Wide Unwired Gapless Solderless Strip to Wire Quick Connectors Adapter for Waterproof RGB WW or RGB+CCT LED Strip Lights—10 Packs, May 5, 2020.

* cited by examiner

SOLDERLESS LED STRIP CONNECTOR

CROSS-REFERENCE TO RELATED APPLICATIONS

This application is a U.S. National Stage Application under 35 U.S.C. § 371 of International Application No. PCT/US2022/071258, filed Mar. 22, 2022, which claims the benefit of and priority under 35 U.S.C. § 119 (e) to U.S. Provisional Patent Application No. 63/164,149, filed Mar. 22, 2021, the contents of which are hereby incorporated by reference in-its entirety their entireties.

TECHNICAL FIELD

The present disclosure relates to light-emitting diode (LED) lighting systems, and more particularly to solderless LED strip connectors.

BACKGROUND

It is known to provide a connector device for electrically connecting two or more light-emitting diode (LED) strips at electrically conductive ends of the strips. LED strips, which may commonly be referred to as LED tape lights or ribbon lights, are popular lighting solutions for numerous residential, commercial, and industrial projects as they provide discrete, efficient and customizable lighting sources that are relatively easy to install. Common uses and placements include the undersurface of shelves or cabinets, interior surfaces of display cases to illuminate the contents within, recessed wall lighting, staircase illumination and backlighting for advertising signs and billboards.

Generally, LED strips have LEDs arranged linearly along a top surface of the strip. The bottom surface of the strip opposite the LED surface is usually applied directly to an installation surface, such as via an adhesive tape. The LED strip may be rigid or flexible and often appears as an elongated ribbon or tape-like material sold in precut strips or rolls that can be cut to a desired length when installed. The LED strip generally provides an indication or cut line along which an installer may cut the LED strip such that electric contacts are provided on both sides of the cut line and thus both ends of the severed strip. The cut ends may present anywhere from one to six or more electric contacts depending on the functionality of the LED strip. For example, frequently, a higher number of contacts are present on LED strips that provide higher illumination and/or multiple colored diodes per LED emitter. Electric contacts of two LED strips may be electrically connected, such as via soldering or a connector device, to provide continuous lighting along multiple strips. A power supply, such as a DC power supply, is often attached to the electric contacts at one end of the LED strip or strips.

Because LED strips generally can only be cut into straight-line sections, installation of LED strips, such as around corners and over uneven surfaces, often involves cutting and electrically connecting several different lengths of strips. Methods of connecting LED strips known in the art include soldering the electrical contacts at two strip ends together and providing electrically conductive connector devices at two strip ends. However, soldering the electric contacts creates resistance at the connection points and can be difficult and labor-intensive when installation involves connecting several lengths of LED strips together. Additionally, connector devices currently known in the art provide unreliable electrical and retaining connections between the device and each of the strips, reduced durability of the connector device itself, suboptimal connectivity to power supplies, and are limited in the number of electric contacts per LED strip that can be simultaneously connected using a single connector. These problems can result in lengthy and difficult installation, frequent replacement of damaged or disconnected parts, and other issues related to unreliable lighting supplies.

SUMMARY

The present disclosure provides a connector for connecting ends of light strips where the connector includes an electrically insulating body with a plurality of slots extending into surfaces of the body to receive separate light strips therein. A plurality of conductive members are disposed within the electrically insulating body, along with at least two sets of screws that threadably engage the conductive members and retaining light strips disposed in the slots. The two sets of screws are electrically connected to one another via the conductive members and provide separate electrical connections between the light strips disposed in the slots and contacted and retained there by the screws. Thus, a solderless LED connector assembly in accordance with the present disclosure provides secure retention of LED strips connected via the connector assembly, a high number of electrical connections provided between LED strips, and significant durability of the connector components.

According to one aspect of the present disclosure, a connector assembly for electrically connecting an end of a first light strip to an end of a second light strip includes an electrically insulating body having a top surface and opposing first and second side surfaces. A first light-strip-receiving slot extends through the first side surface of the electrically insulating body. The first light-strip-receiving slot is configured to receive an end of a first light strip that has electrical contacts. A second light-strip-receiving slot extends through the second side surface of the electrically insulating body. The second light-strip-receiving slot is configured to receive an end of a second light strip that has electrical contacts. A plurality of conductive bars are disposed within the electrically insulating body between the top surface and the first and second light-strip-receiving slots. The plurality of conductive bars are each separated from the first and second light-strip-receiving slots by an intermediate portion of the electrically insulating body. A first set of screws are disposed within the electrically insulating body. Each screw of the first set of screws includes a proximal end, an intermediate section threadably engaged at one of the plurality of conductive bars, and a distal end disposed in the first slot. The distal ends of the first set of screws are configured to discretely contact the electrical contacts of the first light strip. A second set of screws are disposed within the electrically insulating body. Each screw of the second set of screws includes a proximal end, an intermediate section threadably engaged at one of the plurality of conductive bars, and a distal end disposed in the second slot. The distal ends of the second set of screws are configured to discretely contact the electrical contacts of the second light strip. The first set of screws are electrically connected to the second set of screws via the plurality of conductive bars for forming separate electrical connections between the electrical contacts of the first and second light strips.

Implementations of the disclosure may include one or more of the following optional features. In some implementations, the first and second sets of screws each have substantially consistent diameters along a length between and including the proximal and distal ends. In some examples, the proximal ends have a tool-engaging feature that is an axially-aligned notch across the proximal end of each screw, where the notch is configured to receive a tool to rotate the respective screws. The screws may also include a piercing tip at the distal ends to pierce at least partially into the electrical contacts of the first and second light strips. Additionally, a first and second set of wire-receiving notches extend respectively through the first and second side surfaces of the insulating body, each wire receiving notch adjacent to one of the plurality of conductive bars. The wire receiving notches are configured to receive an electrical wire and there may be two wire receiving notches adjacent each conductive bar.

According to another aspect of the present disclosure, a connector assembly configured to receive a first light strip and a second light strip includes an electrically insulating body. The electrically insulating body has a top surface that forms a first set of screw-receiving openings and a second set of screw-receiving openings. The electrically insulating body also has a first side surface that forms a first set of conductive bar receiving openings and a first light-strip-receiving opening. The electrically insulating body further has a second side surface that forms a second set of conductive bar receiving openings and a second light-strip-receiving opening. The electrically insulating body includes a first set of axial passages extending from the first set of screw-receiving openings, a second set of axial passages extending from the second set of screw-receiving openings, and a third set of axial passages extending from the first and second sets of conductive bar receiving openings. The third set of axial passages are substantially orthogonal to the first set of axial passages and the second set of axial passages. A first light-strip-receiving passage extends from the first light-strip-receiving opening and is orthogonal to the first set of axial passages and separate from the third set of axial passages. A second light-strip-receiving opening extends from the second-light-strip receiving opening and is orthogonal to the second set of axial passages and separate from the third set of axial passages. A plurality of conductive bars are disposed within the third set of axial passages. A first set of screws are disposed within the first set of axial passages and each include a proximal end configured to receive a tool operable to rotate the respective screw, an intermediate section threadably engaged at one of the plurality of conductive bars, and a distal end disposed in the first light-strip-receiving passage and configured to directly engage electrical contacts of the first light strip. A second set of screws are disposed within the second set of axial passages and each include a proximal end configured to receive a tool operable to rotate the respective screw, an intermediate section threadably engaged at one of the plurality of conductive bars, and a distal end disposed in the second light-strip-receiving passage and configured to directly engage electrical contacts of the second light strip.

This aspect may also include one or more optional features disclosed herein. In some examples, the first and second sets of axial passages have interior surfaces void of threading. Also, the plurality of conductive bars have substantially flat faces that, when the conductive bars are disposed in the third set of axial passages, the flat faces are disposed at the first and second sets of conductive bar receiving openings.

The details of one or more implementations of the disclosure are set forth in the accompanying drawings and the description below. Other aspects, advantages, purposes, and features will be apparent upon review of the following specification in conjunction with the drawings.

DETAILED DESCRIPTION

Figure 1:
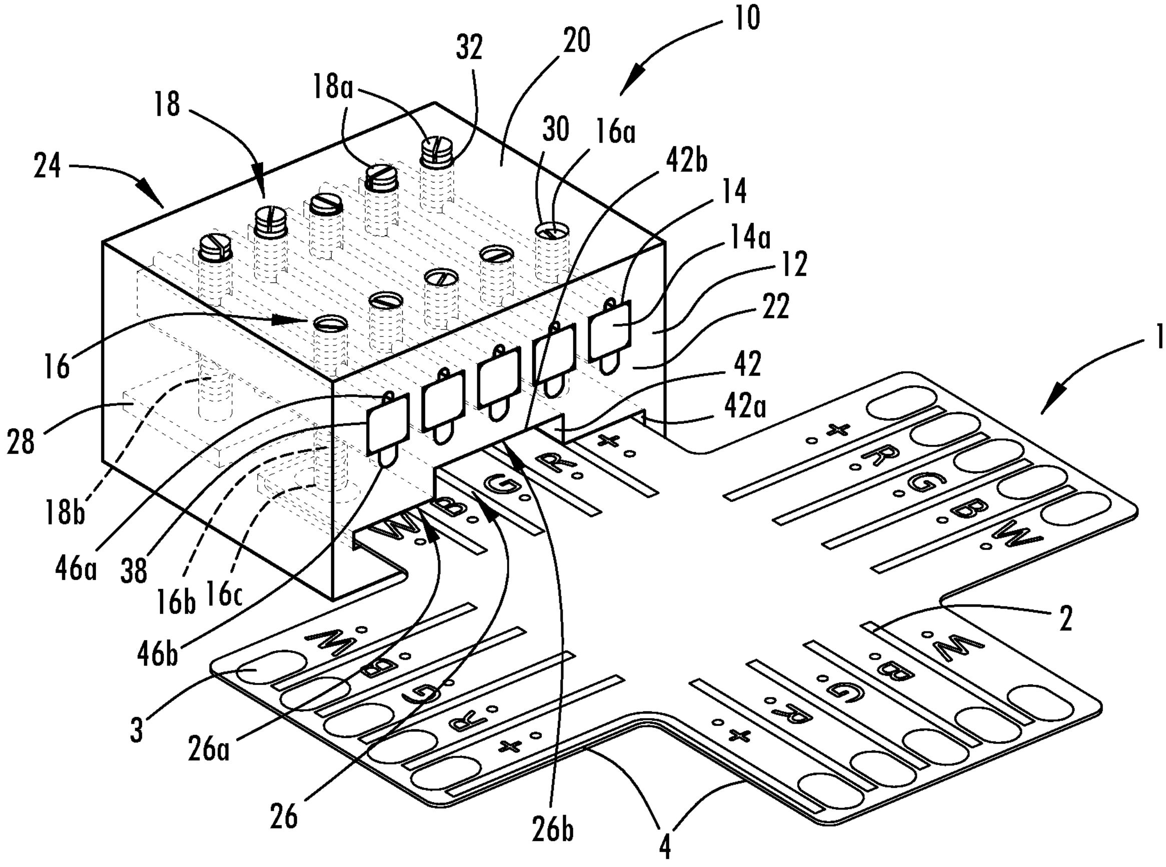
FIG. 1 is a perspective view of a 5-pin light strip connector assembly receiving a connector strip.

Referring now to the drawings and the illustrative examples depicted herein, a solderless light emitting diode (LED) strip connector or assembly is shown receiving a connector strip, which will be described in further detail below. The connector assembly may also be used to connect two or more LED strips or connector strips and/or electrical wires connected to a power supply. Thus, in referencing the connector strip, it is understood that it can be replaced by a similarly embodied end of an LED strip.

LED strips or tape lights or ribbon lights include a number of LED emitters typically arranged in a singular straight row along a narrow strip of a printed circuit board (PCB). The strips are cut to a desired length so that electrical contacts are exposed at a cut end of the strip, the strip is applied to a surface, such as via an adhesive backing, and the strip is connected to a power source to provide lighting in often hard to reach or confined areas. LED strips generally have single rows of LED emitters, but may present one to six or more electric contacts. A higher number of contacts generally corresponds to increased functionality of the strips, such as multiple colored diodes per LED emitter. For example, LED strips with two connectors generally only emit white light while LED strips with four or more connectors are needed to provide multi-colored LED strips. Additionally, while varying in functionality, LED strips typically exist only in standard widths (such as 8 mm, 10 mm and 12 mm varieties).

Because LED strips are linear, they are best used to provide lighting at long, straight surfaces. However, it is often desirable to connect two or more lengths of LED strips, such as to connect lighting sources at a corner surface or to bridge a gap between two surfaces or to connect strips along a significant span or with differently colored or oriented LEDs. To provide a continuous lighting source between the two or more LED strips and/or share the connected power source among several strips, it is necessary to provide an electrical connection between each of the electrical contacts on the two strips being connected. Generally, devices and methods for connecting LED strips include soldering conductors (e.g., wires) between the electrical contacts or connecting the strips using inferior connector devices that retain and provide electrical connection between the strips.

The connector devices known in the art for providing connection between LED strips cannot provide reliable connection and/or accommodate LED strips with a high number of electric contacts (three or more). For example, prior art connectors commonly use snap connectors that provide a loose connection. Additionally, the plastic comprising the LED snap connectors often deteriorates (usually at the snap connection) from the heat cycling of the LEDs, especially when used outside. Thus, the LED strip can easily be pulled out of the connector devices, severing the electrical connection between the strips and risking damage to the strip if it falls from the connector. Connector devices that use other connection means (such as screws) are limited at least in the number of electrical connections that the connector device can accommodate and the reliability of the electrical connections provided by the device. The present disclosure provides an improved LED strip connector component and assembly for providing electrical connection between two or more LED strips having one to six or more electrical contacts.

Figure 5:
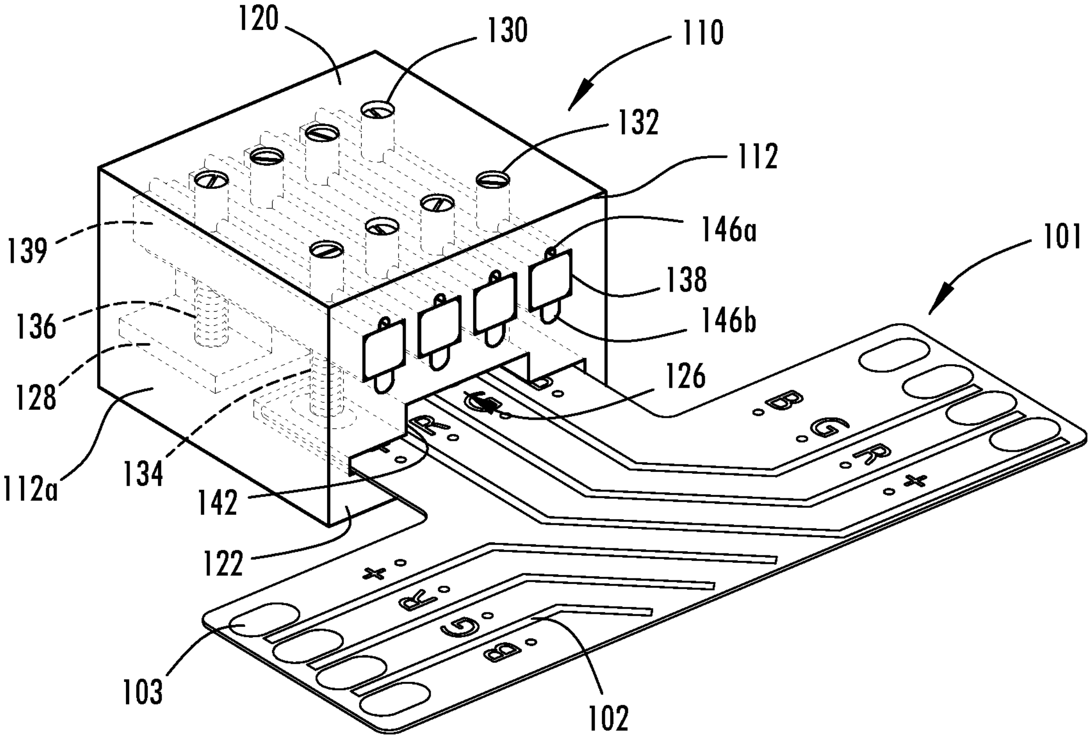
FIG. 5 is a perspective view of a 4-pin light strip connector assembly receiving a connector strip.
Figure 6:
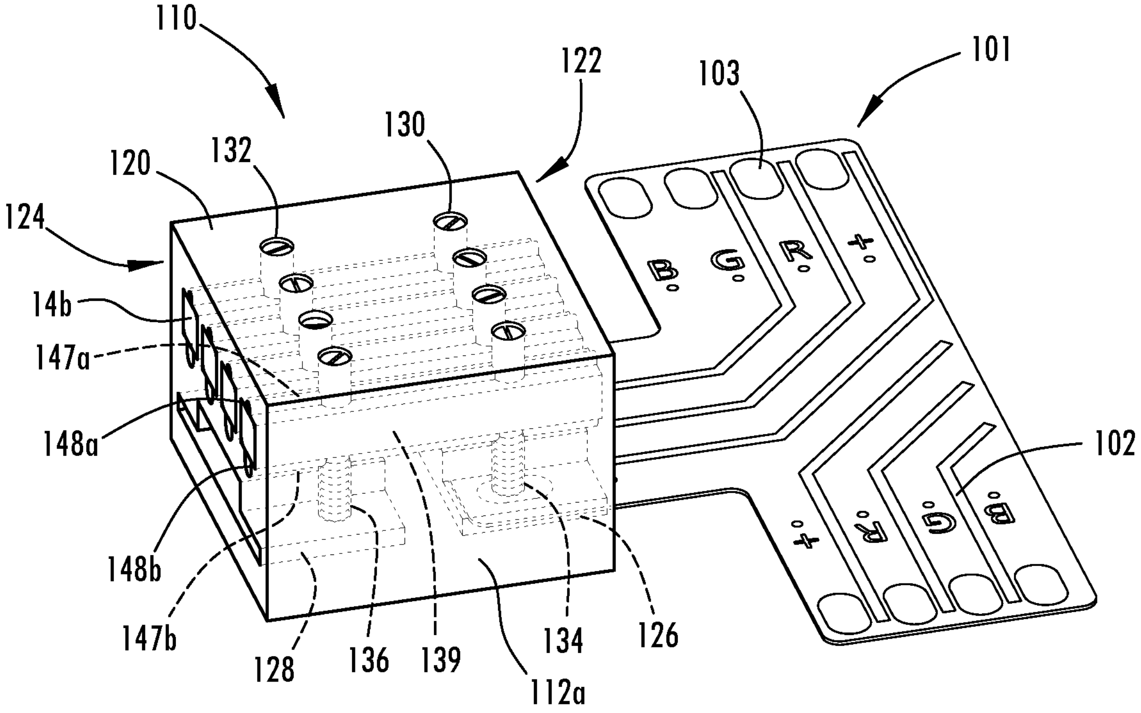
FIG. 6 is a side view of the 4-pin light strip connector assembly of FIG. 5.
Figure 7A:
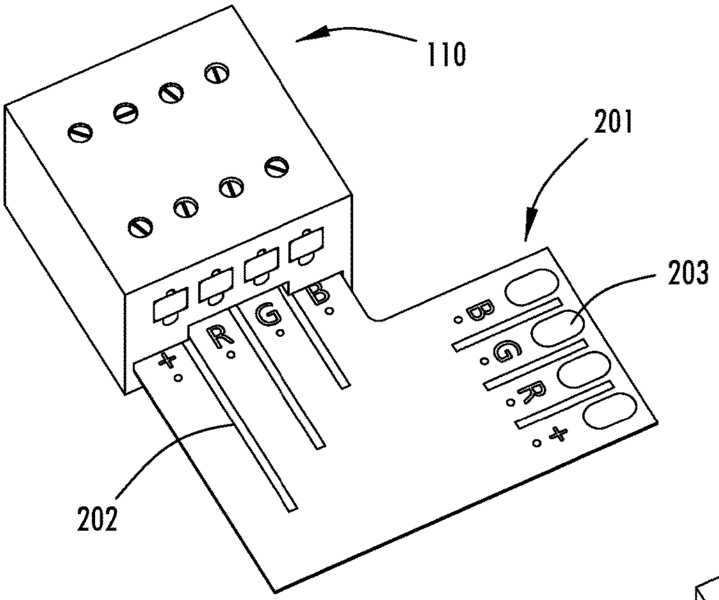
FIG. 7A is a perspective view of 4-pin light strip connector assembly receiving a connector strip.
Figure 7B:
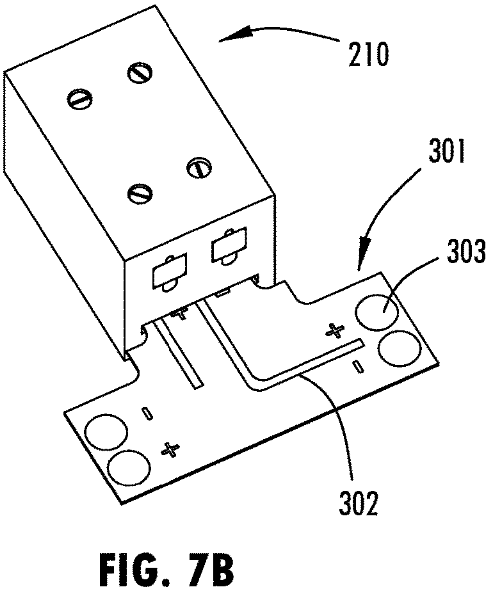
FIG. 7B is a perspective view of a 2-pin light strip connector assembly receiving a connector strip.
Figure 7C:
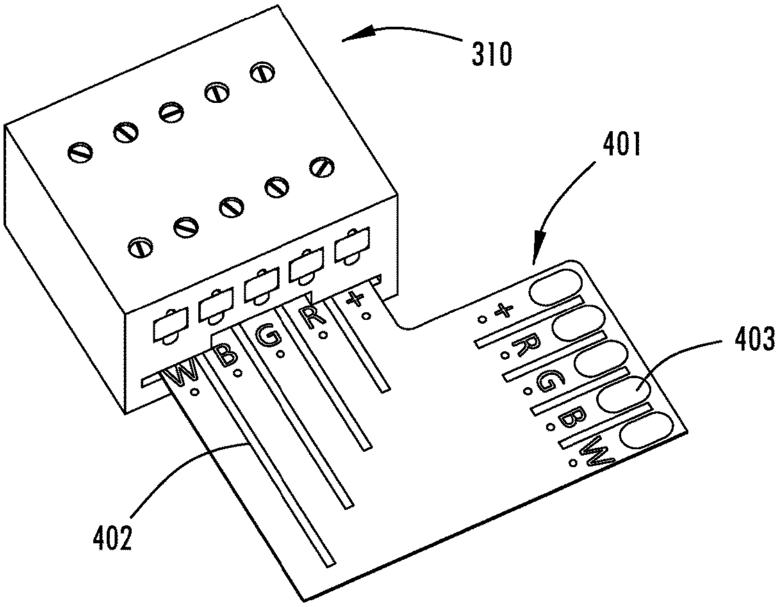
FIG. 7C is a perspective view of a 5-pin light strip connector assembly receiving a connector strip.
Figure 8A:
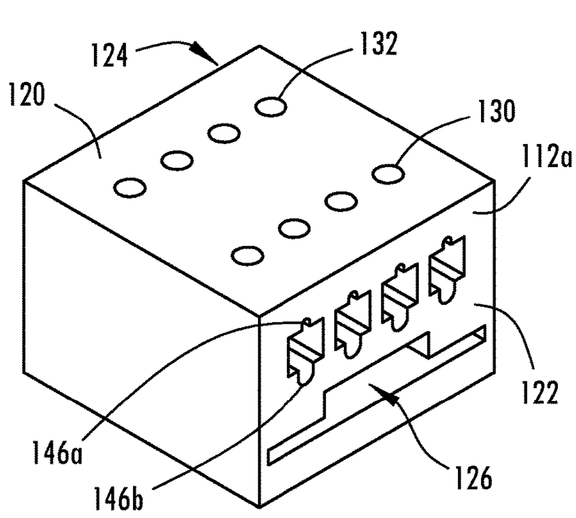
FIG. 8A is a top perspective view of a 4-pin light strip connector component.
Figure 8B:
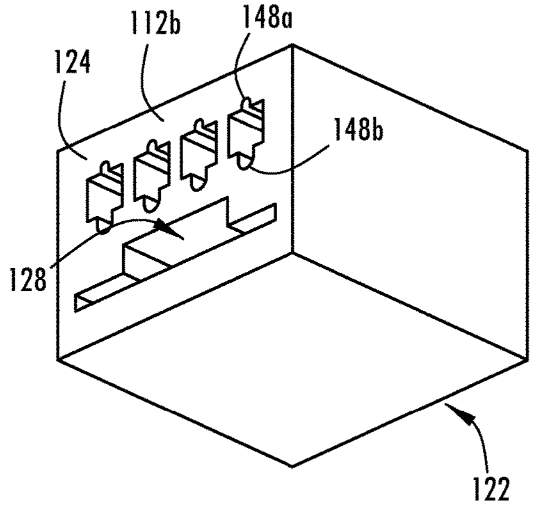
FIG. 8B is a bottom perspective view of the 4-pin light strip connector component shown in FIG. 8A.
Figure 8C:
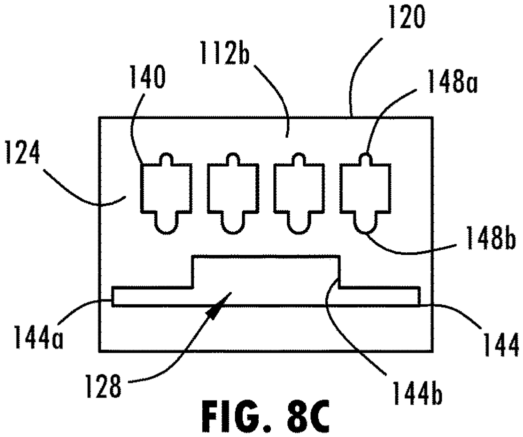
FIG. 8C is a side view of the 4-pin light strip connector component shown in FIG. 9A.
Figure 8D:
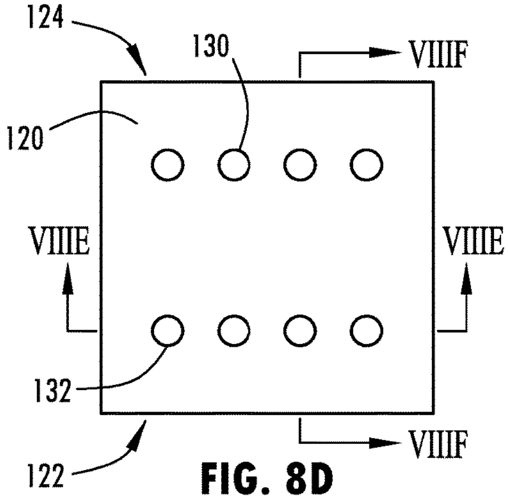
FIG. 8D is a top elevation view of the 4-pin light strip connector component shown in FIG. 8A.
Figure 8E:
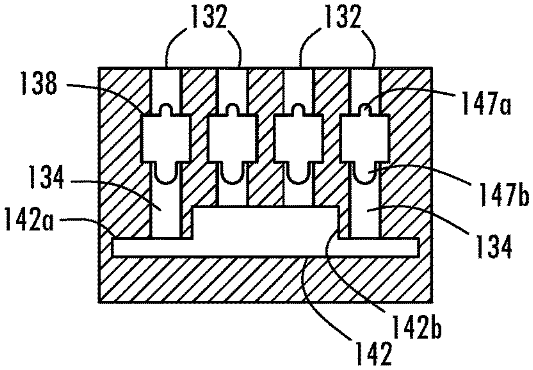
FIG. 8E is a cross sectional view of the 4-pin light strip connector component taken along line VIIIE-VIIIE shown in FIG. 8D.
Figure 8F:
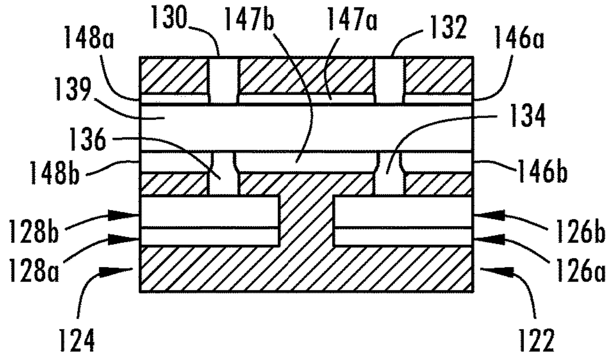
FIG. 8F is a cross sectional view of the 4-pin light strip connector component taken along line VIIIF-VIIIF shown in FIG. 8D.
Figure 9A:
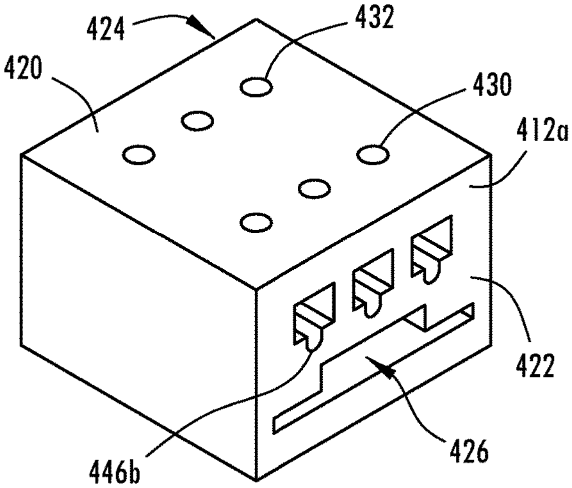
FIG. 9A is a top perspective view of a 3-pin light strip connector component.
Figure 9B:
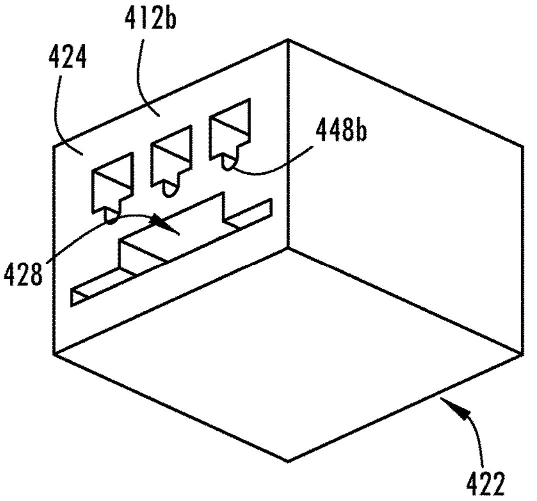
FIG. 9B is a bottom perspective view of the 3-pin light strip connector component shown in FIG. 9A.
Figure 9C:
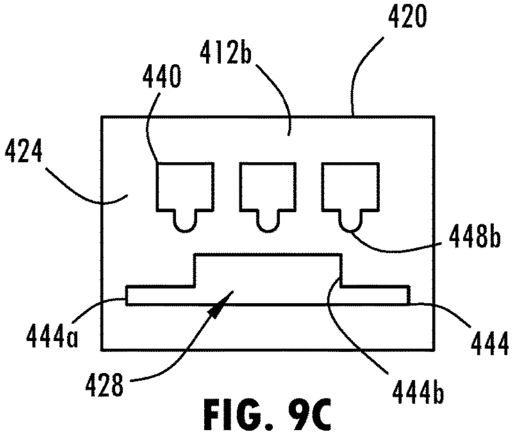
FIG. 9C is a side view of the 3-pin light strip connector component shown in FIG. 9A.
Figure 9D:
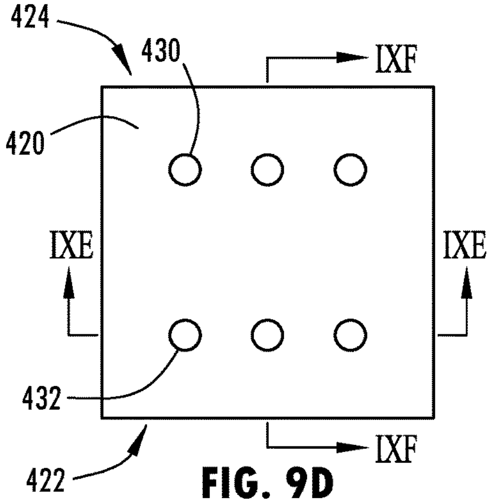
FIG. 9D is a top elevation view of the 3-pin light strip connector component shown in FIG. 9A.
Figure 9E:
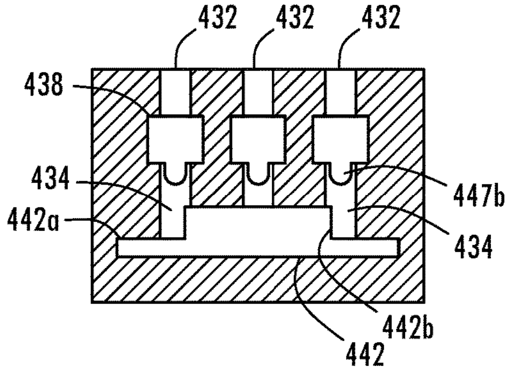
FIG. 9E is a cross sectional view of the 3-pin light strip connector component taken along line IXE-IXE shown in FIG. 9D.
Figure 9F:
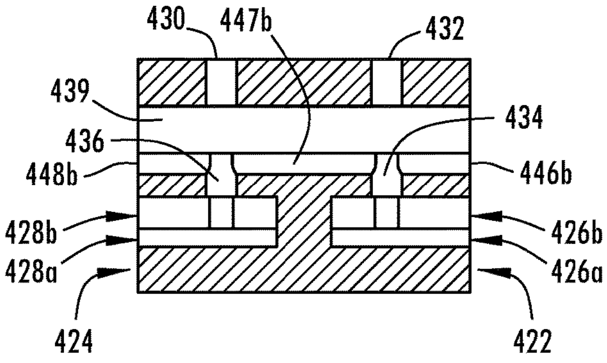
FIG. 9F is a cross sectional view of the 3-pin light strip connector component taken along line IXF-IXF shown in FIG. 9D.
Figure 10A:
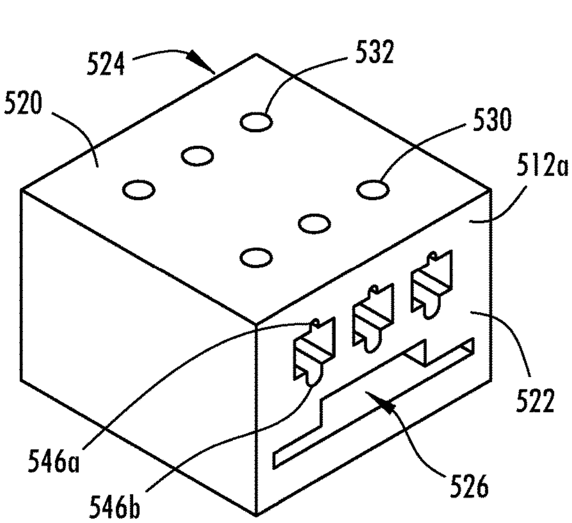
FIG. 10A is a top perspective view of another 3-pin light strip connector component.
Figure 10B:
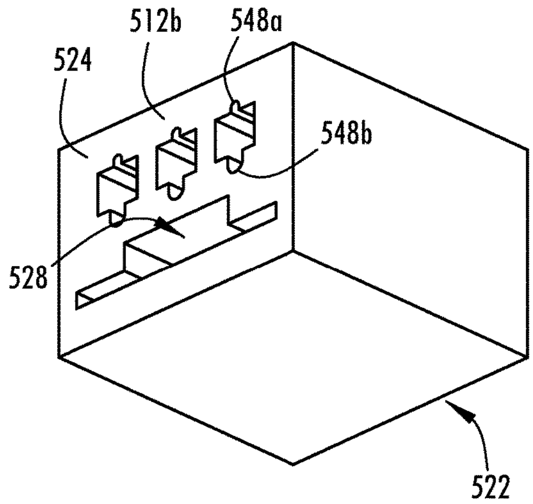
FIG. 10B is a bottom perspective view of the 3-pin light strip connector component shown in FIG. 10A.
Figure 10C:
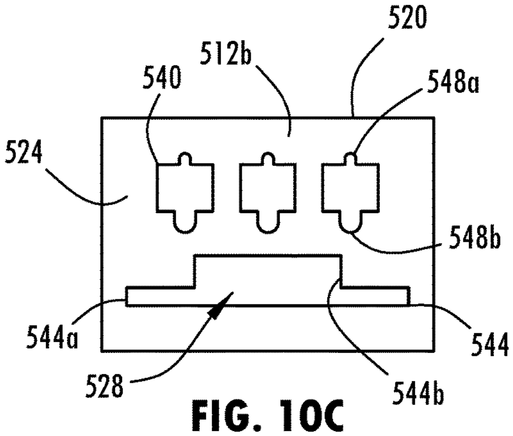
FIG. 10C is a side view of the 3-pin light strip connector component shown in FIG. 10A.
Figure 10D:
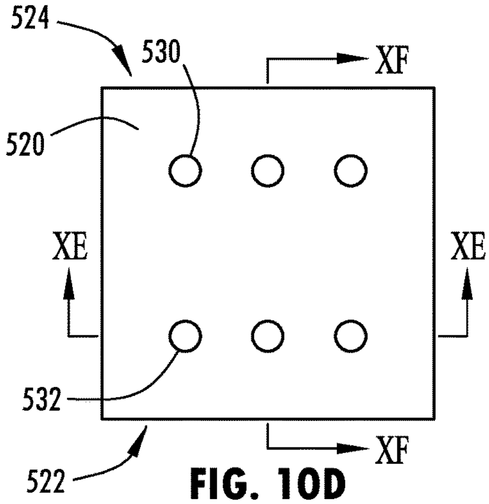
FIG. 10D is a top elevation view of the 3-pin light strip connector component shown in FIG. 10A.
Figure 10E:
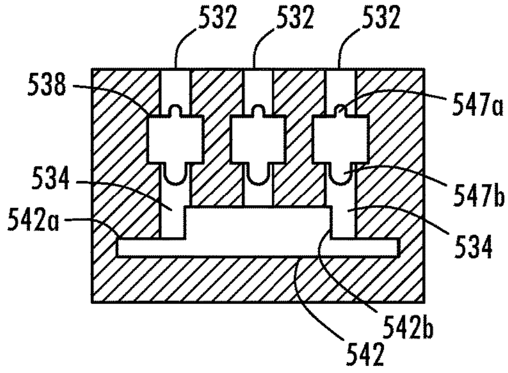
FIG. 10E is a cross sectional view of the 3-pin light strip connector component taken along line XE-XE shown in FIG. 10D.
Figure 10F:
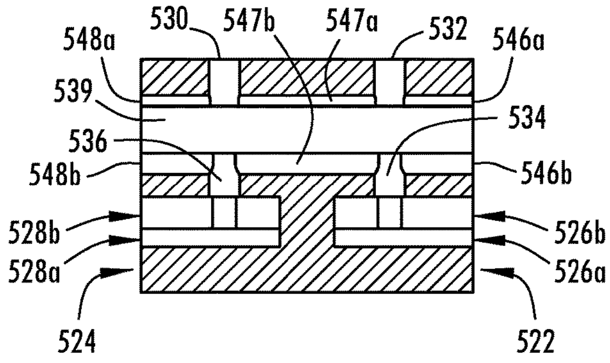
FIG. 10F is a cross sectional view of the 3-pin light strip connector component taken along line XF-XF shown in FIG. 10D; and Like reference symbols in the various drawings indicate like elements.

In reference to FIGS. 1-4, a 5-pin light strip connector or connector assembly 10 is shown receiving a four-way connector strip 1 that has electrical traces 2 leading between conductive contacts 3. The pattern of electrical contacts 3 mimics the pattern on a corresponding LED strip and thus provides electrical connection between connector devices and LED strips over short distances. For example, the connector assembly 10 is shown receiving a connection tab 4 of the four-way connector strip 1. When installed at a lighting surface, the connector assembly 10 may receive an LED strip in its second opening (as described below) and the four-way connector strip 1 may likewise attach to three additional connector assemblies with LED strips via connection tabs 4. Thus, an electrical connection is formed between the multiple connector assemblies, LED strips and the four-way connector strip via the connector strip's electrical contacts and the connector assemblies receiving the connector strip at its electrical contacts. The four-way connector strip 1 is an example of a connector strip that may be used to change direction between LED strips or otherwise provide a connection between multiple LED strips. The connector strip may also comprise a T-shape (as shown in FIGS. 5 and 6) or an L-shape connector (FIGS. 7A-C).

The light strip connector assembly 10 includes an electrically insulating body 12, five conductive members or bars 14 disposed within the electrically insulating body 12, a first set of screws 16 disposed in the electrically insulating body 12 and threadably engaging the conductive members 14 and the electrical connections 3 of the connector strip 1 that are disposed in a first light strip receiving slot 26. The connector assembly 10 also includes a second set of screws 18 similarly situated to the first set of screws 16, but configured to engage electrical contacts of an LED strip or connector strip received in a second light strip receiving slot 28. Thus, the connector strip 1 can be electrically connected to an LED strip or connector strip via the first set of screws 16 in electrical connection with the second set of screws 18 via the conductive members 14. The electrically insulating body 12 has a top surface 20 and opposing first and second side surfaces 22, 24. The first light strip receiving slot 26 extends through the first side surface 22 and is configured to receive an end of a strip having electrical contacts. Similarly, the second light strip receiving slot 28 extends through the second side 24 surface and is also configured to receive an end of a strip having electrical contacts. The conductive members 14 are disposed within the body between the top surface 20 and the first and second light strip receiving slots 26, 28 and are separated from the strip receiving slots by an intermediate portion 12*a* of the electrically insulating body. Each of the first and second sets of screws 16, 18 have a proximal end 16*a*, 18*a* exposed at the top surface, an intermediate section 16*b*, 18*b* threadably engaged at one of the conductive members 14, and a distal end 16*c*, 18*c* configured to discretely contact the electrical contacts disposed respectively in the first and second light strip receiving slots 26, 28. Although shown as a 5-pin light strip connector assembly configured to receive and electrically connect LED strips and connector strips having five electrical contacts, it should be understood that a connector assembly in accordance with the present disclosure can receive strips having any number of electrical connections, such as 2-pin, 3-pin, 4-pin, or 6-pin configurations.

The electrically insulating body 12 as illustrated generally resembles a block or cube of injection molded material. The body has a top surface 20 and opposing first and second side surfaces 22, 24. The top surface forms a first set of screw-receiving openings 30 and a second set of screw-receiving openings 32. Axial passages, which may be referred to as screw holes 34, 36, extend from each of the screw-receiving openings to provide passage through the insulating body 12 to electrically conductive screws 16, 18. As shown, the screw holes are not threaded to prioritize the threaded engagement between the screws and the conductive members over threaded engagement between the screws and insulating body. The first side surface 22 forms a first set of conductive-bar-receiving openings 38 and a first light-strip-receiving opening 42. Axial passages extend from each of the conductive-bar-receiving openings and the first light-strip-receiving opening. These axial passages may be referred to respectively as conductive bar passages 39 and the first light strip or strip connector receiving slot 26. The first strip receiving slot 26 as shown is receiving a connector strip 1 having five electrical contacts 3. Similar to the first side surface, the second side surface 24 forms a second set of conductive-bar-receiving openings 40 and a second light-strip-receiving opening 44, with the axial conductive bar passage 39 extending between the first and second surface conductive-bar-receiving openings. Likewise the second strip receiving slot 28 extends from the second light strip receiving opening 44 into the conductive body.

The conductive bar passages 39 are separated from one another and run parallel to the first and second strip receiving slots 26, 28 and are separated from the strip receiving slots by an intermediary portion 12*a* of the conductive body 12. The first and second sets of screw holes 34, 36 are substantially orthogonal to the conductive bar passages 39 (but may extend into the conductive body at any suitable angle relative to the conductive bar passages) and pass through the conductive body 12 from the top surface 20 to the respective strip receiving slots. Each of the first and second sets of screw holes 34, 36 intersects one of the conductive bar passages 39. The conductive body 12, aside from the passages and slots described herein, is a solid block of material injection molded as a single piece to provide a durable and solid construction and reduce manufacturing costs.

Figure 2:
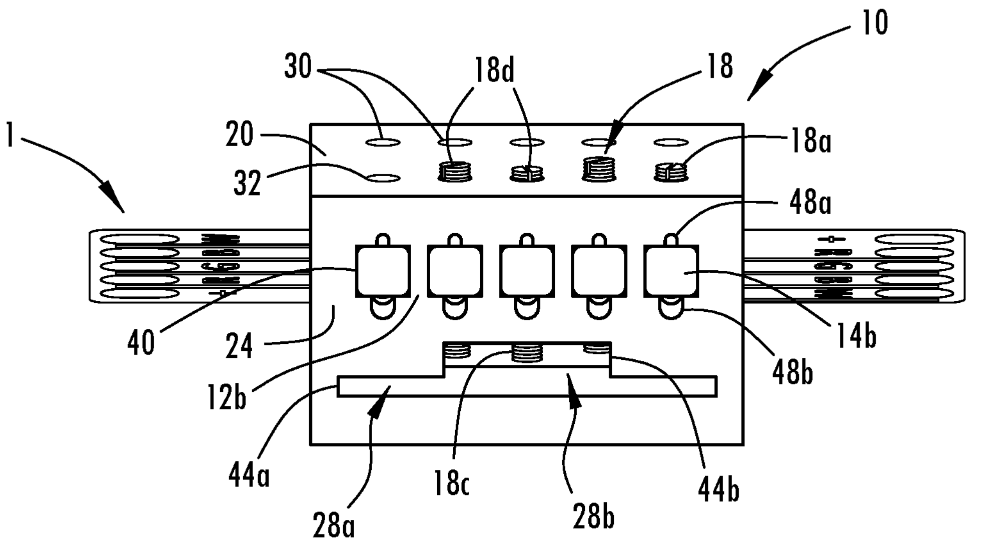
FIG. 2 is a rear elevation view of the 5-pin light strip connector assembly of FIG. 1.

As shown by FIG. 2, the second strip receiving opening 44 comprises a strip receiving portion 44*a* and an LED receiving portion 44*b* and the corresponding slot 28 (which is also representative of the first strip receiving opening and slot) comprises a strip receiving portion 28*a* and an LED receiving portion 28*b* to form a T-shaped cross-sectional area. The width of the strip receiving portion 28*a* corresponds to the number of electrical contacts present on the LED strip or connector strip configured to be received by the connector assembly (and therefore number of screws per set of screws and number of conductive members). The width of the LED receiving portion 28*b* corresponds to the cross-sectional area of a typical LED emitter. Thus, the width of the strip receiving portion may change between connector assembly embodiments configured to receive strips having different electrical contact configurations while the width of the LED receiving portion will remain substantially the same across different embodiments. When an LED strip is inserted into the receiving slot 28, the strip and electrical contacts are received in the strip receiving portion 28*a* of the slot while an LED disposed on the strip near the electrical contacts is received in the LED receiving portion 28*b*. Likewise, the first receiving slot 26 comprises a strip receiving portion 26*a* and an LED receiving portion 26*b* extending into the body from a strip receiving opening 42 comprising a strip receiving portion 42*a* and an LED receiving portion 26*b*. Because an LED is received into an opening in the body, the conductive body 12 is molded with transparent or translucent plastic so that LEDs in or near the receiving slots still provide visible illumination. The transparent or translucent material retains the visibility of the LEDs, while not jeopardizing structural integrity of the connector by forming windows and/or notches through the height or side area of the connector structure.

When assembled, (such as shown in FIGS. 1-7) the conductive members or conductive bars 14 are inserted into the conductive bar passages 39, the first set of screws 16 are inserted and driven into the first set of screw holes 34, and the second set of screws 18 are inserted and driven into the second set of screw holes 36. The first and second sets of screws 16, 18 threadably engage the conductive bars 14 and are driven through the conductive bars to the first and second light strip receiving slots 26, 28. A strip 1 is inserted into the first light strip receiving slot 26 so that the electric contacts 3 on the connection tab 4 of the strip are each aligned with a screw of the first set of screws 16. The screws 16 are driven down further to contact the electric contacts 3 and may be driven so as to at least partially pierce the electric contacts. This forms a robust mechanical and electrical connection in a manner that does not interrupt the electrical connection between the screw and the electric contact. Rather, the screw driven to provide a biasing force upon the strip (and optionally driven through the strip) provides an improved retaining relationship between the connector and the strip.

The plurality of conductive members or bars 14 resemble elongated, metallic blocks and pass through the electrically insulating body 12 to electrically connect the first and second sets of screws 16, 18. The screws form such a strong electrical connection because the conductive bars that span between the corresponding pairs have a solid cross-section that allows for a threaded interior surface between the upper and lower surfaces of the bar.

The conductive members 14 comprise first and second end surfaces 14*a*, 14*b* having solid cross-sectional areas exposed at the first and second side surfaces 22, 24 of the insulating body 12. Although FIG. 2 shows the second side surface 24 of the insulating body, a view of the first side surface 22 would be substantially the same. The conductive bars 14 may fit snugly in the conductive bar passages 39, at least in a lateral dimension, and are separated from one another laterally by dividing portions 12*b* of the conductive body 12. As shown in FIG. 2, the example of the conductive bars 14 have a substantially square cross section taken transverse to the length of the bars. However, it is contemplated that additional examples may have bars with differently shaped cross sections, such as circular or rectangular shapes or the like.

Moreover, a top and bottom wire receiving passage 47*a*, 47*b* extend inward from U-shaped top wire receiving openings 46*a*, 48*a* and U-shaped bottom wire receiving opening 46*b*, 48*b*. The top and bottom U-shaped wire receiving openings are formed by the first and second side surfaces 22, 24. The wire receiving passages 47*a*, 47*b* extending into the body 12 run adjacent the conductive bar passages 39, exposing side surfaces of the conductive members 14. The notches are configured to receive electric wires, for example, to attach a power supply to power LED strips received at the connector assembly. Embodiments of the connector assembly may have wire notches above and/or below the conductive bar passages. For example, in FIG. 9 the wire notches only extend into the conductive body from the first and second side surfaces adjacent a lower surface of the conductive bar passages. Generally, if a wire is disposed within the upper wire receiving notch and a screw is driven through the conductive bar, the biasing force created by the screw and conductive bar is directed upward to retain the wire within its respective upper notch. Alternatively, the wire may be electrically and mechanically retained in the notches without the screw being required to directly engage the wire thereat.

Figure 3:
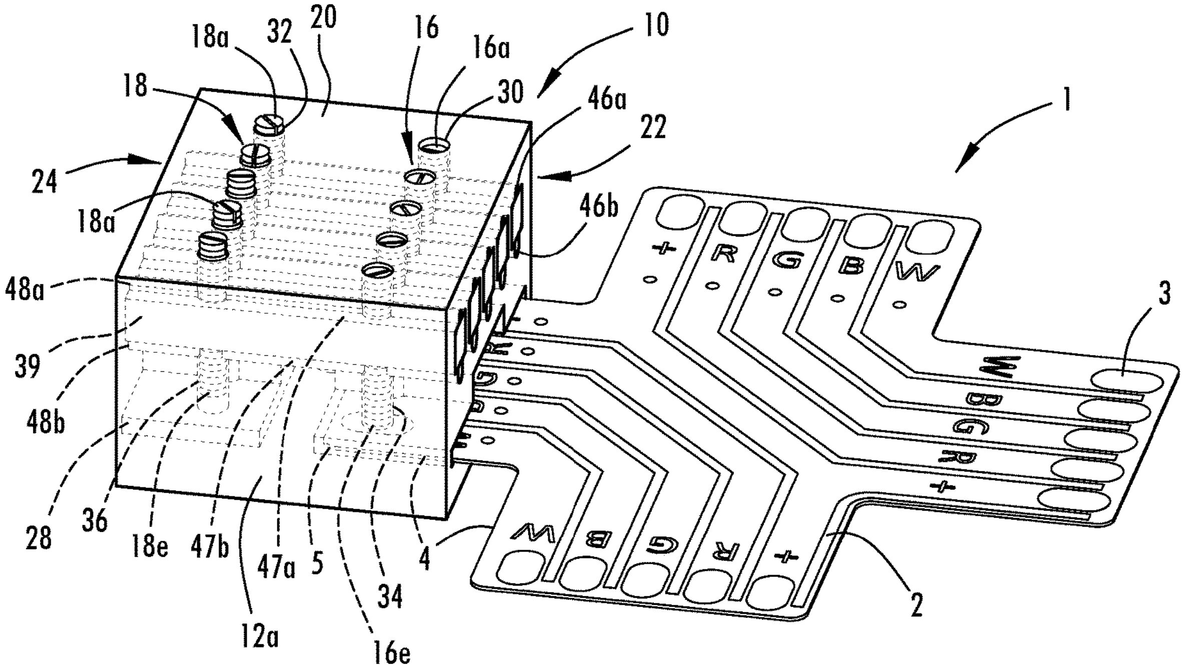
FIG. 3 is a side perspective view of the 5-pin light strip connector assembly of FIG. 1.

Turning now to FIG. 3, it can be seen that the first and second strip receiving slots 26, 28 are separated by the intermediary portion 12*a* of the insulating body 12. This intermediary portion 12*a* of the body not only electrically and physically separates the first and second receiving slots 26, 28 (so as to avoid inadvertent electrical connection between electrical contacts not meant to be electrically connected), but the intermediary portion 12*a* provides reference surfaces 26*c*, 28*c* for inserting the strips into the receiving slots. Thus, a user may insert the strip 1 into the strip receiving slot 26 until a top edge 5 of the strip contacts the reference surface 26*c*, therefore ensuring that the electrical contacts 3 are properly aligned with their respective screws.

To form the electrical connection, the connector 10 has a first set of screws 16 that engage an end of one LED strip or connector strip and a second set of screws 18 that engage the end of another LED strip or connector strip. Corresponding pairs of the first and second set of screws are electrically connected by a plurality of conductive bars 14 that extend through the body 12 of the connector. The first set of screws 16 pass through the electrically insulating body 12 from the top surface 20, each screw threadably engages a conductive bar 14, and engages an electrical contact 3 of the strip 1 positioned in the receiving slot 26 to retain the strip 1 at the connector 10 and provide electrical connection via the screw. Each screw generally has the same diameter along the entire length of the screw. That is, the proximal end 16*a* (or head), intermediary section 16*b*, and distal end 16*c* (or tip) all comprise the same diameter. To engage tightly arranged contacts on ends of the lighting strips (such as especially in the case of three, four, five, and six adjacent contacts on the lighting strips), screws with enlarged diameter heads would not function because the heads of the screws dimensionally prevent tighter clustering of the screws. These "head-less" screws (which share the approximately the same diameter at the head as the threaded shank of the screw) accommodating of the tight spacing.

Figure 4:
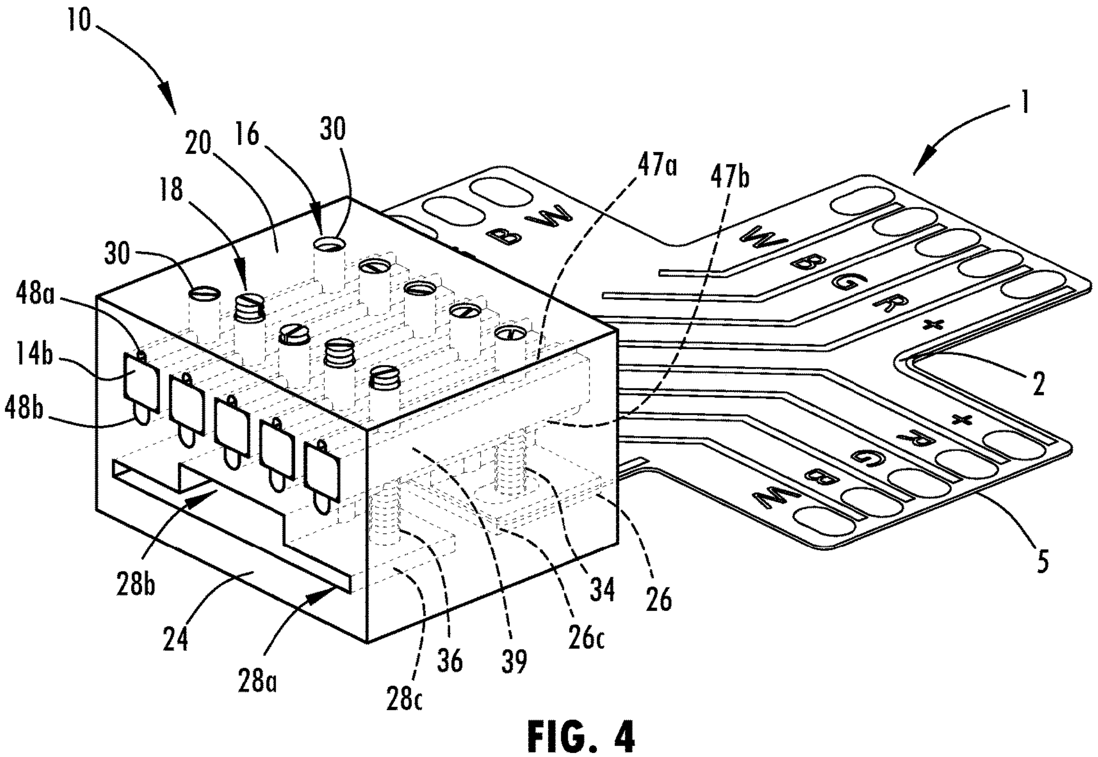
FIG. 4 is another perspective view of the 5-pin light strip connector assembly of FIG. 1.

In reference to FIG. 4, each screw comprises a tool engaging feature 16*d* at the proximal end 16*a* and a piercing tip 16*e* at the distal end 16*c*. The tool engaging feature 16*d* is an axially-aligned notch disposed across the proximal end at which a tool is received to rotate the screw and drive it through the threaded engagement with the conductive bar to the strip receiving slot below. The piercing tip 16*e* engages the electric contact of the strip received at the first strip receiving slot 26 and may pierce the electric contact if driven forcibly enough. The second set of screws 18 are similar to the first set of screws, but engage a second strip in the second strip receiving slot 28, but otherwise still comprise a tool engaging feature 18*d* at the proximal end 18*a*, threaded intermediary portions 18*b*, a distal end 18*c* with a piercing tip 18*e*, and a consistent diameter.

Although the illustrated examples show the conductive members as received at conductive bar passages and exposed at the first and second surfaces of the insulating body, other examples may have the conductive bars encased inside the insulating body. The bars in one example may be insert molded in the body of the connector. In these additional examples, the bar is substantially U-shaped, with one leg of the U disposed in the first strip receiving slot, the second leg of the U disposed in the second strip receiving slot, and the middle portion of the U disposed in a portion of the insulating body between the two slots. One or more sets of screws passes through the insulating material of the body from the top surface so that when the screw engages the U-shaped bar, the bar is biased towards strips received in the first and second receiving slots. Thus, the conductive bar forms the contact point with the electric contacts of the strips rather than the screws. One set of screws may be used to create the biasing force of the U-shaped bar in both the first and second receiving slots or a first set of screws may provide the biasing force to the leg of the U disposed in the first receiving slot and a second set of screws may provide the biasing force to the leg of the U disposed in the second receiving slot.

Returning now to the illustrated embodiments and specifically in reference to FIGS. 5 and 6, a 4-pin connector assembly 110 is shown receiving a T-shaped connector strip 101 having four electrical contacts 103. FIGS. 7A-C shows the 4-pin connector assembly 110 receiving an L-shaped connector strip 201 having four electrical contacts 203, a 2-pin connector assembly 210 receiving a T-shaped connector strip 301 having two electrical contacts 303, and a 5-pin connector assembly 310 receiving an L-shaped connector strip 401 having five electrical contacts 403. Similar to the other connector strips discussed throughout, these strips all comprise electrical traces 102, 202, 302, 402 for electrically connecting LED strips that may be received at the connector assemblies shown. The various connector strips correspond to LED strips having differing electrical connection needs due to their functionality.

FIGS. 8A-F-10A-F shows different examples of the insulating body alone. FIGS. 8A-F depicts the insulating body 112 of the 4-pin connector assembly 110 also shown in FIGS. 5-7 while FIGS. 9A-F and 10A-F depict two embodiments of a 3-pin connector assembly insulating body 412, 512. In reference to FIG. 8, the 4-pin connector body 112 is shown. The first and second side surfaces 122, 124 form the first and second light strip receiving openings 142, 144 having strip receiving portions 142*a*, 144*a* and LED receiving portions 142*b*, 144*b*. The width of the strip receiving portions are configured to receive a strip having four electrical contacts. The first and second side surfaces 122, 124 also form the conductive bar receiving openings 138, 140 and adjacent top wire receiving openings 146*a*, 148*a* and bottom wire receiving openings 146*b*, 148*b*. The top surface 120 forms the first and second sets of screw receiving openings 130, 132. The corresponding axial passages extending into the body 112 from the respective openings (as described above) mirror the shape of the opening as they extend through surfaces and into the insulating body. In other words, the shape of the first and second light strip receiving openings 142, 144 have a T cross-sectional shape that substantially matches a T cross-sectional shape of the first and second light strip receiving slots 126, 128, the conductive member receiving openings 138, 140 and conductive bar passages 139 share a square cross-sectional shape, the screw receiving openings 130, 132 and corresponding screw holes 134, 136 share a circular cross-sectional shape, and the upper and lower wire-receiving openings 146*a*, 146*b*, 148*a*, 148*b* and corresponding passages 147*a*, 147*b* share a U cross-sectional shape. The bar receiving openings and passages are separated from the slot receiving passage via an intermediary portion 112*a* of the body and the bar receiving passages are separated from one another via dividing portions 112*b* of the body.

Referring to FIGS. 9A-F, the first and second side surfaces 422, 424 form the first and second light strip receiving openings 442, 444 having strip receiving portions 442*a*, 444*a* and LED receiving portions 4426, 444*b*. The width of the strip receiving portions are configured to receive a strip having three electrical contacts. The first and second side surfaces 422, 424 also form the conductive bar receiving openings 438, 440 and adjacent wire receiving openings 446*b*, 448*b*. The top surface 420 forms the first and second sets of screw receiving openings 430, 432. The corresponding axial passages extending into the body 412 from the respective openings (as described above) mirror the shape of the opening as they extend through surfaces and into the conductive body. In other words, the shape of the first and second light strip receiving openings 442, 444 have a T cross-sectional shape that substantially matches a T cross-sectional shape of the first and second light strip receiving slots 426, 428, the conductive member receiving openings 438, 440 and conductive bar passages 439 share a square cross-sectional shape, the screw receiving openings 430, 432 and corresponding screw holes 434, 436 share a circular cross-sectional shape, and the lower wire-receiving openings 446*b*, 448*b* and corresponding passages 447*b* share a U cross-sectional shape. The bar receiving openings and passages are separated from the slot receiving passage via an intermediary portion 412*a* of the body and the bar receiving passages are separated from one another via dividing portions 412*b* of the body.

Turning now to FIGS. 10A-F, another embodiment of a 3-pin connector body 512 is shown. The first and second side surfaces 522, 524 form the first and second light strip receiving openings 542, 544 having strip receiving portions 542*a*, 544*a* and LED receiving portions 542*b*, 544*b*. The width of the strip receiving portions are configured to receive a strip having three electrical contacts. The first and second side surfaces 522, 524 also form the conductive bar receiving openings 538, 540 and adjacent top wire receiving openings 546*a*, 548*a* and bottom wire receiving openings 546*b*, 548*b*. The top surface 520 forms the first and second sets of screw receiving openings 530, 532. The corresponding axial passages extending into the body 512 from the respective openings (as described above) mirror the shape of the opening as they extend through surfaces and into the insulating body. In other words, the shape of the first and second light strip receiving openings 542, 544 have a T cross-sectional shape that substantially matches a T cross-sectional shape of the first and second light strip receiving slots 526, 528, the conductive member receiving openings 538, 540 and conductive bar passages 539 share a square cross-sectional shape, the screw receiving openings 530, 532 and corresponding screw holes 534, 536 share a circular cross-sectional shape, and the upper and lower wire-receiving openings 546*a*, 546*b*, 548*a*, 548*b* and corresponding passages 547*a*, 547*b* share a U cross-sectional shape. The bar receiving openings and passages are separated from the slot receiving passage via an intermediary portion 512*a* of the body and the bar receiving passages are separated from one another via dividing portions 512*b* of the body.

Thus, the present disclosure provides a light strip connector assembly comprising an electrically insulating body, a plurality of conductive bars, and first and second sets of screws. The insulating body includes a top surface and opposing first and second side surfaces with first and second light-strip-receiving slots extending respectively through the first and second side surfaces. The first and second light-strip-receiving slots are configured to receive ends of first and second light strips that have electrical contacts. The conductive bars are disposed within the insulating body between the top surface and the light-strip-receiving slots and are separated from the light-strip-receiving slots by an intermediate portion of the insulating body. The first and second sets of screws are disposed within the insulating body and each screw includes a proximal end, an intermediate section threadably engaged at a conductive bar, and a distal end in the first or second light-strip-receiving slot. When the first and second light strips are disposed in the first and second light-strip-receiving slots, the distal ends of the first and second sets of screws respectively contact the electrical contacts of the first and second light strips. Thus, the first set of screws electrically connect to the second set of screws via the conductive bars, forming discrete electrical connections between the first and second light strips.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

In addition, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Also for purposes of this disclosure, the terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A connector assembly for electrically connecting an end of a first light strip to an end of a second light strip, the connector assembly comprising:
an electrically insulating body having a top surface and opposing first and second side surfaces;
wherein a first light-strip-receiving slot extends through the first side surface of the electrically insulating body and is configured to receive an end of a first light strip that has electrical contacts;
wherein a second light-strip-receiving slot extends through the second side surface of the electrically insulating body and is configured to receive an end of a second light strip that has electrical contacts;
a plurality of conductive bars disposed within the electrically insulating body between the top surface of the electrically insulating body and the first and second light-strip-receiving slots, the plurality of conductive bars each separated from the first and second light-strip-receiving slots by an intermediate portion of the electrically insulating body;
a first set of screws disposed within the electrically insulating body and each comprising a proximal end exposed at the top surface, an intermediate section threadably engaged at one of the plurality of conductive bars, and a distal end disposed in the first light-strip-receiving slot and configured to discretely contact the electrical contacts of the first light strip;
a second set of screws disposed within the electrically insulating body and each comprising a proximal end exposed at the top surface, an intermediate section threadably engaged at one of the plurality of conductive bars, and a distal end disposed in the second light-strip-receiving slot and configured to discretely contact the electrical contacts of the second light strip; and
wherein the first set of screws are electrically connected to the second set of screws via the plurality of conductive bars for forming separate electrical connections between the electrical contacts of the first and second light strips, and
wherein the plurality of conductive bars are encased by the electrically insulating body such that the plurality of conductive bars are surrounded by insulating material.

2. The connector assembly of claim 1, wherein the first and second sets of screws each comprise a substantially consistent diameter along a length between and including proximal and distal ends.

3. The connector assembly of claim 2, wherein the first and second sets of screws each comprise a tool-engaging feature at the proximal ends configured to receive a tool operable to rotate the respective screws.

4. The connector assembly of claim 1, wherein each of the first and second sets of screws comprise a piercing tip at the distal ends configured to pierce the electrical contacts.

5. The connector assembly of claim 1, wherein a first set of wire-receiving notches extend through the first side surface of the electrically insulating body, each of the first set of wire-receiving notches adjacent one of the plurality of conductive bars and configured to receive an end of an electrical wire, and wherein a second set of wire-receiving notches extend through the second side surface of the electrically insulating body, each of the second set of wire-receiving notches adjacent one of the plurality of conductive bars and configured to receive an end of an electrical wire.

6. The connector assembly of claim 1, wherein the intermediate sections of the first and second sets of screws each threadably engage one of the plurality of conductive bars at a threaded surface of the conductive bars and wherein the threaded surfaces of the conductive bars extend through an entire thickness of the conductive bars.

7. The connector assembly of claim 6, wherein the first and second sets of screws are configured to be disposed within first and second sets of axial passages, respective, and the first and second sets of axial passages comprise interior surfaces void of threading.

8. The connector assembly of claim 1, wherein the plurality of conductive bars comprises at least three conductive bars and the first and second sets of screws both comprise at least three screws.

9. The connector assembly of claim 1, wherein the electrically insulating body comprises a transparent material.

10. The connector assembly of claim 1, wherein the first light strip and the second light strip comprise four or more electrical contacts.

11. A connector assembly configured to receive a first light strip and a second light strip, the connector assembly comprising:
an electrically insulating body having:
a top surface forming a first set of screw-receiving openings and a second set of screw-receiving openings;
a first side surface forming a first set of conductive bar receiving openings and a first light-strip-receiving opening; and
a second side surface forming a second set of conductive bar receiving openings and a second light-strip-receiving opening,
wherein the electrically insulating body includes:
a first set of axial passages extending from the first set of screw-receiving openings;
a second set of axial passages extending from the second set of screw-receiving openings;
a third set of axial passages extending from the first set of conductive bar receiving openings and the second set of conductive bar receiving openings, wherein the third set of axial passages are substantially orthogonal to the first set of axial passages and the second set of axial passages;
a first light-strip-receiving passage extending from the first light-strip-receiving opening, wherein the first light-strip-receiving passage is orthogonal to the first set of axial passages and separate from the third set of axial passages; and
a second light-strip-receiving passage extending from the second light-strip-receiving opening, wherein the second light-strip-receiving passage is orthogonal to the second set of axial passages and separate from the third set of axial passages;

a plurality of conductive bars disposed within the third set of axial passages, wherein the plurality of conductive bars are encased by the electrically insulating body such that the plurality of conductive bars are surrounded by insulating material;

a first set of screws disposed within the first set of axial passages and each comprising a proximal end configured to receive a tool operable to rotate the respective screw, an intermediate section threadably engaged at one of the plurality of conductive bars, and a distal end disposed in the first light-strip-receiving passage and configured to directly engage electrical contacts of the first light strip; and a second set of screws disposed with the second set of axial passages and each comprising a proximal end configured to receive a tool operable to rotate the respective screw, an intermediate section threadably engaged at one of the plurality of conductive bars, and a distal end disposed in the second light-strip-receiving passage and configured to directly engage electrical contacts of the second light strip.

12. The connector assembly of claim 11, wherein the first and second sets of axial passages comprise interior surfaces void of threading.

13. The connector assembly of claim 11, wherein each of the plurality of conductive bars, when disposed within the third set of axial passages, comprise substantially flat faces disposed at the first and second sets of conductive bar receiving openings.

14. The connector assembly of claim 11, wherein the first and second sets of screws each comprise a substantially consistent diameter along a length between and including the proximal and distal ends.

15. The connector assembly of claim 14, wherein the first and second sets of screws each comprise a tool-engaging feature at the proximal ends configured to receive a tool operable to rotate the respective screws.

16. The connector assembly of claim 15, wherein the tool-engaging feature comprises an axially-aligned notch disposed across the proximal ends of the first and second sets of screws.

17. The connector assembly of claim 11, wherein the plurality of conductive bars each comprise first end surfaces exposed at the first side surface of the electrically insulating body and second end surfaces exposed at the second side surface of the electrically insulating body.

18. The connector assembly of claim 11, wherein a first set of wire-receiving openings extend through the first side surface of the electrically insulating body, each of the first set of wire-receiving openings adjacent one of the plurality of conductive bars and configured to receive an end of an electrical wire, and wherein a second set of wire-receiving openings extend through the second side surface of the electrically insulating body, each of the second set of wire-receiving openings adjacent one of the plurality of conductive bars and configured to receive an end of an electrical wire.

19. The connector assembly of claim 11, wherein the plurality of conductive bars comprises at least three conductive bars and the first and second sets of screws both comprise at least three screws.

20. A lighting system comprising:

a connector assembly comprising:

an electrically insulating body having:

a top surface forming a first set of screw-receiving openings and a second set of screw-receiving openings, the first set of screw-receiving openings opening to a first set of axial passages and the second set of screw-receiving openings opening to a second set of axial passages;

a first side surface orthogonal to the top surface and forming a first set of conductive bar receiving openings and a first light-strip-receiving opening, the first light-strip-receiving opening extending to a first light-strip-receiving passage interconnecting and orthogonal to the first set of axial passages;

a second side surface orthogonal to the top surface and forming a second set of conductive bar receiving openings and a second light-strip-receiving opening, the second light-strip-receiving opening extending to a second light-strip-receiving passage interconnecting and orthogonal to the second set of axial passages;

a third set of axial passages extending between the first set of conductive bar receiving openings and the second set of conductive bar receiving openings;

a plurality of conductive bars disposed within the third set of axial passages;

a first set of screws disposed within the first set of axial passages and threadably engaging the plurality of conductive bars; and a second set of screws disposed with the second set of axial passages and threadably engaging the plurality of conductive bars, wherein the first and second sets of screws each comprise a substantially consistent diameter along a length between and including proximal and distal ends;

a first light strip having an end disposed in the first light-strip-receiving passage, the end having electrical contacts discretely engaged by distal ends of the of the first set of screws; and a second light strip having an end disposed in the second light-strip-receiving passage, the end having electrical contacts discretely engaged by distal ends of the of the second set of screws;

a plurality of top U-shaped wire receiving openings formed into at least one of the first side surface and the second side surface; and a plurality of bottom U-shaped wire receiving openings formed into at least one of the first side surface and the second side surface, wherein each of the plurality of top U-shaped wire receiving openings are positioned above each of the plurality of conductive bars, wherein each of the plurality of bottom U-shaped wire receiving openings are positioned below each of the plurality of conductive bars, and wherein the plurality of top and bottom U-shaped wire receiving openings extend into the electrically insulating body via a plurality of wire receiving passages configured to receive an electrical wire.

* * * * *